(12) United States Patent
Grabowska (10) Patent No.: US 10,422,344 B1
(45) Date of Patent: Sep. 24, 2019

(54) TURBOCHARGER TURBINE DIFFUSER WITH DESWIRL RIBS

(71) Applicant: BorgWarner Inc., Auburn Hills, MI (US)

(72) Inventor: David George Grabowska, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/130,707

(22) Filed: Sep. 13, 2018

(51) Int. Cl.
  *F01D 25/30* (2006.01)
  *F04D 29/44* (2006.01)
  *F04D 17/10* (2006.01)

(52) U.S. Cl.
  CPC .......... *F04D 29/441* (2013.01); *F04D 17/10* (2013.01); *F05D 2220/40* (2013.01); *F05D 2240/126* (2013.01)

(58) Field of Classification Search
  None
  See application file for complete search history.

(56) References Cited

U.S. PATENT DOCUMENTS

| 4,529,356 A * | 7/1985 | Ciccarone | F01N 13/08 415/207 |
| 6,543,221 B1 * | 4/2003 | Klaus | F01N 3/28 60/280 |
| 2015/0369073 A1 * | 12/2015 | Japikse | F04D 29/664 415/115 |

* cited by examiner

*Primary Examiner* — Kayla Mccaffrey
(74) *Attorney, Agent, or Firm* — Miller, Matthias & Hull LLP (57) ABSTRACT

A turbine diffuser configured for use in a turbocharger is disclosed. The turbine diffuser may comprise a diffuser wall defining the diffuser and circumscribing a central axis of the diffuser, and a plurality of deswirl ribs each extending axially along the diffuser wall. Each of the deswirl ribs may have a first end attached to the diffuser wall, and an opposing second end exposed in an interior space of the diffuser. The deswirl ribs may be configured to reduce rotation of exhaust gas that flows through the diffuser.

20 Claims, 6 Drawing Sheets

TURBOCHARGER TURBINE DIFFUSER WITH DESWIRL RIBS

TECHNICAL FIELD

The present disclosure generally relates to turbochargers and, more specifically, to turbocharger turbine diffusers having deswirl ribs for reducing rotation of the exhaust gas flow.

BACKGROUND

Vehicle engine systems may include a turbocharger that uses the exhaust flow to increase the boost pressure of the intake air that is supplied to the engine. Specifically, a turbocharger may have a compressor section with a compressor wheel, and a turbine section with a turbine wheel and a diffuser downstream of the turbine wheel. The flow of exhaust gas through the turbine section may cause the turbine wheel to rotate and drive the rotation of the compressor wheel through an interconnecting shaft. The rotating compressor wheel may pressurize the intake air that is supplied to the engine through the intake manifold.

At the design point of the turbine section, the flow of the exhaust gas exits the turbine wheel with little to no swirl/rotation relative to the turbine housing. The design point represents the mass flow that yields the peak operation efficiency of the turbine section at a given speed. As the mass flow deviates from the design point, the turbine section is considered to be operating under off-design conditions in which the flow of the exhaust gas exiting the turbine wheel exhibits rotation relative to the turbine housing. The swirling or rotating exhaust gas flow exiting the turbine wheel under off-design conditions may move radially outward toward the limits of the diffuser due to the conservation of angular momentum.

Many diesel engine systems include an aftertreatment system in the exhaust pipe to remove or reduce the level of certain pollutants in the exhaust gas stream. Such aftertreatment systems use various catalysts that selectively convert targeted pollutants in the exhaust gas stream. Engine manufacturers are increasingly positioning aftertreatment catalysts, such as diesel oxidation catalysts (DOCs), closer to the discharge of the turbine section. For instance, a DOC catalyst may be placed immediately downstream of the downstream end of the turbine diffuser, or may even protrude into the turbine diffuser. This arrangement advantageously provides the catalyst with high temperature exhaust gases as the gases exit the turbine wheel, promoting catalyst light off and catalytic conversion of targeted pollutants in the exhaust gas stream. However, under off-design conditions, the swirling/rotating exhaust gases may move radially outward toward the outer edges of the catalyst. As such, the exhaust gas may not be uniformly distributed across the face of the catalyst under off-design conditions, leading to reduced catalytic efficiency.

U.S. Patent Application Number 2016/0245119 discloses a turbocharger diffuser having a center body within the diffuser supported by deswirl vanes extending from a wall of the diffuser. The center body and the deswirl vanes create a deswirl passageway for the exhaust gases flowing through the diffuser. While effective, the reference does not mention the use of the deswirl passageway to promote an even distribution of exhaust gas flow across the face of a downstream aftertreatment catalyst.

Thus, there is a need for strategies for improving the uniformity of exhaust gas flow to aftertreatment catalysts that are positioned near the turbine section discharge.

SUMMARY

In accordance with one aspect of the present disclosure, a turbine diffuser configured for use in a turbocharger is disclosed. The turbine diffuser may comprise a diffuser wall defining the diffuser and circumscribing a central axis of the diffuser. The turbine diffuser may further comprise a plurality of deswirl ribs each extending axially along the diffuser wall. Each of the deswirl ribs may have a first end attached to the diffuser wall, and an opposing second end exposed in an interior space of the diffuser. The deswirl ribs may be configured to reduce rotation of exhaust gas that flows through the diffuser.

In accordance with another aspect of the present disclosure, a turbocharger for an engine system is disclosed. The engine system may have an exhaust pipe with an aftertreatment catalyst for treating an exhaust gas generated by the engine system. The turbocharger may comprise a compressor section, and a turbine section rotatably coupled to the compressor section via a shaft. The turbine section may include a turbine wheel and a diffuser downstream of the turbine wheel. The diffuser may be defined by a diffuser wall that extends circumferentially about a central axis of the diffuser and surrounds an interior space of the diffuser. The turbocharger may further comprise a plurality of deswirl ribs extending axially along the diffuser wall. Each of the deswirl ribs may have a first end attached to the diffuser wall, and an opposing second end exposed for contact with the exhaust gas that flows through the interior space of the diffuser. The deswirl ribs may be configured to reduce a tangential velocity of the exhaust gas that flows through the diffuser.

In accordance with another aspect of the present disclosure, a method for providing a uniform distribution of exhaust gas flow to an aftertreatment catalyst of an engine system having a turbocharger is disclosed. The aftertreatment catalyst may be positioned adjacent to a downstream end of a turbine diffuser of the turbocharger. The method may comprise providing a plurality of deswirl ribs extending axially along a diffuser wall of the diffuser. Each of the deswirl ribs may have a first end attached to the diffuser wall, and an opposing second end exposed in an interior space of the diffuser. The method may further comprise straightening a flow of the exhaust gas flowing through the diffuser with the deswirl ribs if the exhaust gas is rotating, and allowing the straightened flow of the exhaust gas to flow to the aftertreatment catalyst.

These and other aspects and features of the present disclosure will be more readily understood when read in conjunction with the accompanying drawings.

DETAILED DESCRIPTION

Figure 1:
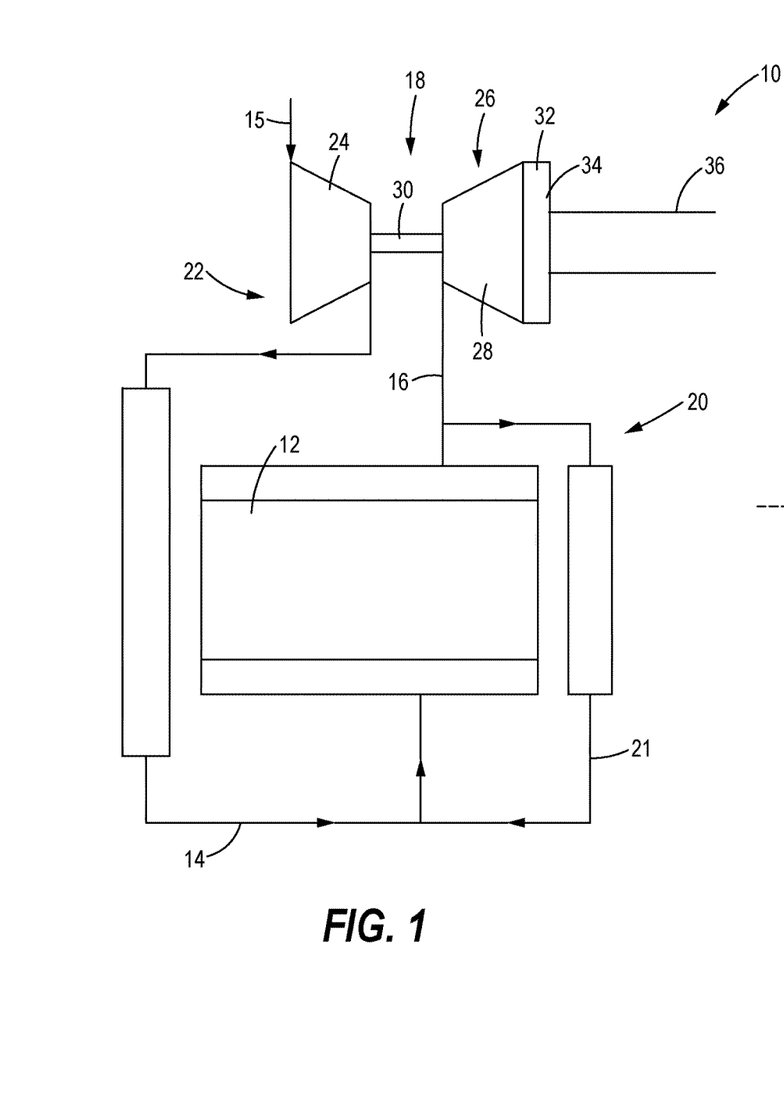
FIG. 1 is a schematic diagram of a vehicle engine system having a turbocharger with a turbine section, and an aftertreatment catalyst positioned near or at a discharge of the turbine section, constructed in accordance with the present disclosure.

Referring now to the drawings, and with specific reference to FIG. 1, an exemplary engine system 10 is shown. The engine system 10 may be installed in a vehicle, or it may be used for a stationary application (e.g., a generator set). The engine system 10 includes a diesel engine 12 having an intake manifold 14 to supply intake air 15 to the combustion chambers of the engine 12 for combustion. The engine system 10 further includes an exhaust manifold 16 that directs exhaust gas generated in the engine 12 to a turbocharger 18. The turbocharger 18 uses the exhaust gas flow to increase the boost pressure of the intake air 15 that is supplied to the engine 12, providing an increase in the engine's power density by allowing more fuel to be combusted. Optionally, the engine system 10 may also include an exhaust gas recirculation (EGR) system 20 for recirculating the exhaust gas back to the engine 12 through recirculation lines 21 to reduce combustion temperatures and the formation of nitrogen oxides ($NO_x$) in the engine 12.

The turbocharger 18 includes a compressor section 22 having a compressor wheel 24, and a turbine section 26 having a turbine wheel 28. A shaft 30 rotatably couples the compressor wheel 24 and the turbine wheel 28. The flow of exhaust gas through the turbine section 26 causes the turbine wheel 28 to rotate, thereby driving the rotation of the compressor wheel 24 via the interconnecting shaft 30. The rotating compressor wheel 24 pressurizes the intake air 15 being supplied to the engine 12 through the intake manifold 14. The pressurized intake air 15 has a higher density for a given volume than air at atmospheric pressure. Consequently, more fuel can be added to the pressurized intake air 15 at a given air/fuel ratio, and more power and torque can be generated by combusting a greater quantity of fuel.

At or near a discharge of the turbine section 26 may be an aftertreatment catalyst 32, such as a diesel oxidation catalyst (DOC) 34, to catalytically convert one or more pollutants in the exhaust gas stream prior to release of the exhaust gas to the environment through an exhaust pipe 36. Although not shown in FIG. 1, it will be understood that the engine system 10 may have additional aftertreatment catalysts in the exhaust pipe 36 to reduce the level of pollutants in the exhaust gas stream.

Figure 2:
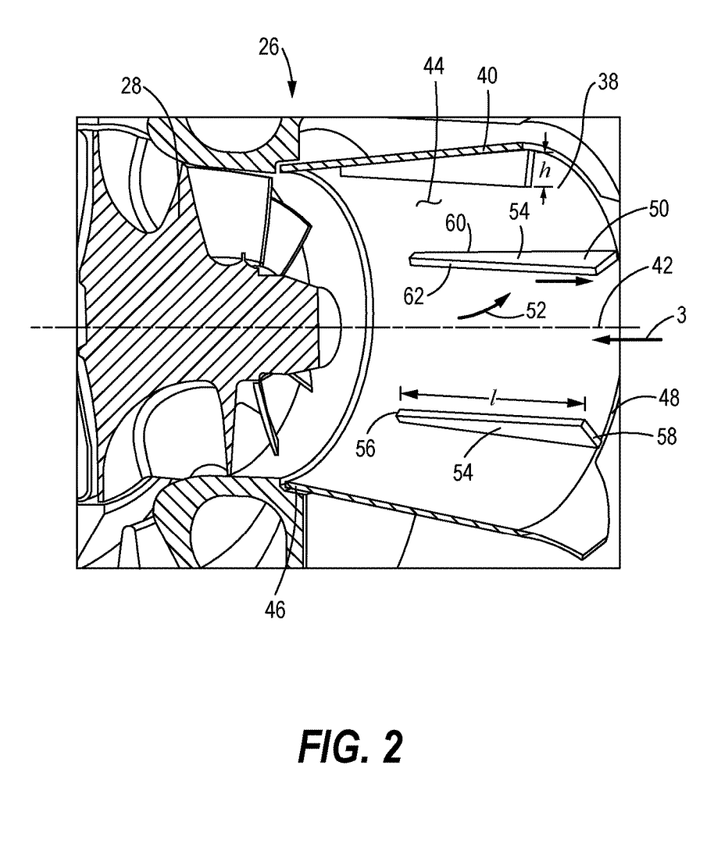
FIG. 2 is a cross-sectional view through a portion of the turbine section of the turbocharger of FIG. 1, illustrating deswirl ribs in a diffuser of the turbine section, constructed in accordance with the present disclosure.

The structure of the turbine section 26 is shown in more detail in FIG. 2. The turbine section 26 includes a diffuser 38 downstream of the turbine wheel 28 and defined by a diffuser wall 40 that circumscribes a central axis 42 of the diffuser 38. The diffuser wall 40 circumferentially surrounds and defines an interior space 44 of the diffuser 38 through which the exhaust gas exiting the turbine wheel 28 flows prior to entering the exhaust pipe 36. The diffuser wall 40 extends axially from an upstream end 46 to a downstream end 48, and the aftertreatment catalyst 32 may be positioned in the exhaust pipe 36 adjacent to the downstream end 48 of the diffuser 38 (also see FIG. 5). However, in some cases, the aftertreatment catalyst 32 may protrude into the interior space 44 of the diffuser 38. The diffuser wall 40 may be angled such that the cross-sectional area of the diffuser 38 increases from the upstream end 46 to the downstream end 48.

The diffuser 38 includes a plurality of deswirl ribs 50 that extend axially along the diffuser wall 40. Depending on various design considerations, the diffuser 38 may have between 2 and about 30 deswirl ribs 50, although the diffuser 38 may have more than 30 deswirl ribs 50 in some circumstances. The deswirl ribs 50 are configured to reduce the rotation of rotating exhaust gas flow 52 flowing through the diffuser 38 under off-design conditions. FIG. 2 depicts rotating exhaust gas flow 52 being straightened upon impact with one of the deswirl ribs 50 under an off-design condition. In particular, the rotating exhaust gas flow 52 impinges on a side face 54 of the deswirl rib 50, and the tangential velocity of the rotating flow is thereby reduced. The straightening of the exhaust gas flow prevents the exhaust gas from moving radially outward to the outer limits of the diffuser wall 40 and distributing primarily around the outer edges of the aftertreatment catalyst 32. The straightened exhaust gas flow more uniformly distributes across the face of the aftertreatment catalyst 32 to promote catalytic efficiency. However, when the turbine section 26 is operating at the design point and the exhaust gas is flowing axially (not rotating), the deswirl ribs 50 may have little to no impact on the flow direction of the exhaust gas and the non-rotating flow may be maintained.

The deswirl ribs 50 may be uniformly spaced about the inner circumference of the diffuser wall 40, with equivalent angular spacings between the ribs 50. In other arrangements, the deswirl ribs 50 may be asymmetrically distributed with varying angular spacings between the deswirl ribs 50. Each of the deswirl ribs 50 may have an axial length (l) beginning at an upstream start point 56 and terminating at a downstream termination point 58, and the start points 56 and the termination points 58 of the ribs 50 may be positioned at different locations along the diffuser wall 40 in various designs of the diffuser 38. For example, although FIG. 2 depicts the termination points 58 of the deswirl ribs 50 as being flush with the downstream end 48 of the diffuser 38, the deswirl ribs 50 may terminate at more upstream locations in alternative designs of the diffuser 38 (see further discussion below).

Each of the deswirl ribs 50 have a first, radially outward end 60 attached to the diffuser wall 40 and an opposing second, radially inward end 62 that is exposed in the interior space 44 of the diffuser 38 for contact with the exhaust gas flowing therethrough. The deswirl ribs 50 may be integrally formed with the diffuser wall 40, or they may be attached thereto by welding or other suitable attachment methods. The deswirl ribs 50 are only attached at the first, radially outward ends 60 to the diffuser wall 40, and are not attached to any other structure within the diffuser 38. Rather, the deswirl ribs 50 are axially-extending nubs along the diffuser wall 40 that do not protrude much into the discharge of the turbine wheel 28. The deswirl ribs 50 do not traverse the diffuser 38, and do not approach the central axis 42. It is thought that this arrangement may promote the stability of the deswirl ribs 50 in the high vibration environment of the turbine diffuser 38, while also minimizing pressure waves reflected off of the deswirl ribs 50 that could impinge on the turbine wheel 28 and cause undesirable vibrations at the turbine wheel 28.

Each of the deswirl ribs 50 has a height (h) as measured from the first, radially outward end 60 to the second, radially inward end 62. As shown in FIG. 2, the heights (h) of the deswirl ribs 50 increases along the length of the diffuser wall 40, such that the deswirl ribs 50 become progressively taller on moving downstream along the diffuser wall 40. The taller portions of the deswirl ribs 50 may be more effective at preventing the exhaust gas flow from skipping over the ribs 50 and bypassing the straightening influence of the ribs 50. Furthermore, the lengths (l) of the deswirl ribs 50 may be shorter than or equivalent to the axial length of the diffuser 38. In the axial direction, the deswirl ribs 50 may extend parallel to the central axis 42 of the diffuser 38, as shown, although the deswirl ribs 50 may be angled or curved with respect to the central axis 42 in alternative arrangements.

Figure 3:
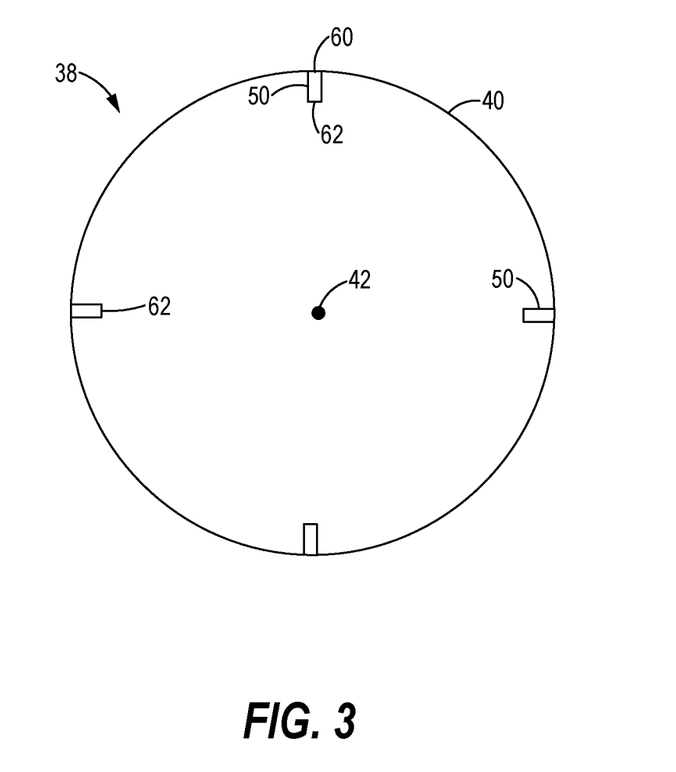
FIG. 3 is an end view of the diffuser as viewed from the direction 3 of FIG. 2, constructed in accordance with the present disclosure.
Figure 4:
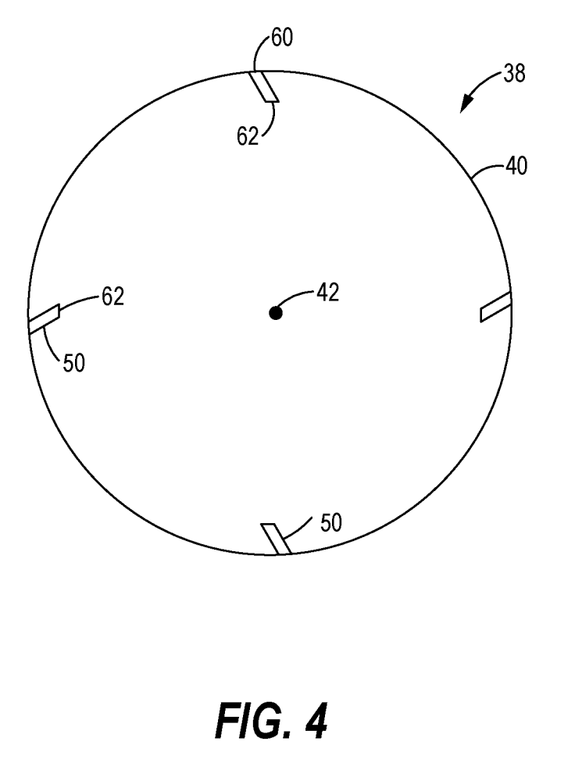
FIG. 4 is an end view similar to FIG. 3, but with the deswirl ribs being angled with respect to a diffuser wall, constructed in accordance with the present disclosure.

Turning now to FIG. 3, the deswirl ribs 50 may extend radially inward toward the central axis 42, such that the deswirl ribs 50 are perpendicular to the diffuser wall 40 and the second, radially inward ends 62 are pointed directly toward the central axis 42. Alternatively, as shown in FIG. 4, the deswirl ribs 50 may be angled or tilted with respect to the diffuser wall 40 such that the second, radially inward ends 62 do not point directly toward the central axis 42. If tilted or angled with respect to the diffuser wall 40, the deswirl ribs 50 may all be angled in the same direction, as shown.

Figure 5:
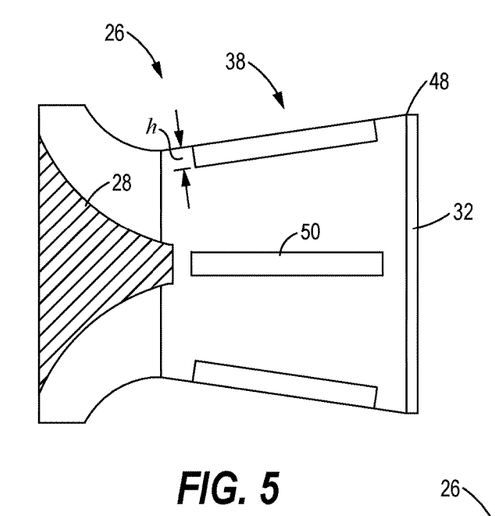
FIG. 5 is a cross-sectional view of the turbine section similar to FIG. 2, but with a height of the deswirl ribs being constant along a length of the diffuser, constructed in accordance with the present disclosure.
Figure 6:
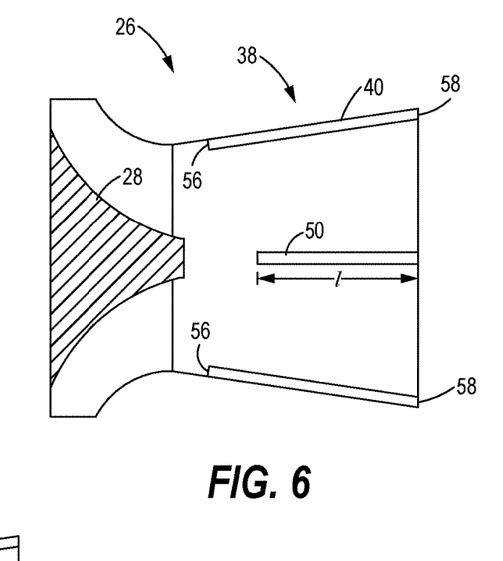
FIG. 6 is a cross-sectional view of the turbine section similar to FIG. 2, but with the deswirl ribs having different starting points along the diffuser wall, constructed in accordance with the present disclosure.
Figure 7:
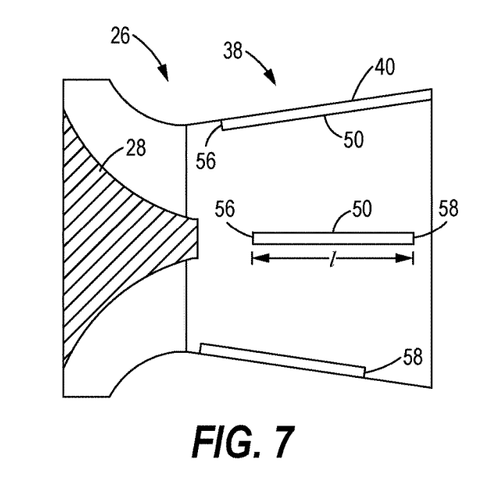
FIG. 7 is a cross-sectional view of the turbine section similar to FIG. 6, but with the deswirl ribs having both different starting points and different termination points along the diffuser wall, constructed in accordance with the present disclosure.

In alternative arrangements, the heights (h) of the deswirl ribs 50 may be constant along the length of the diffuser wall 40 as shown in FIG. 5. In addition, the deswirl ribs 50 may have different lengths (l) in the axial direction, as shown in FIGS. 6-7. For instance, the start points 56 of the deswirl ribs 50 may be positioned at various axial locations along the diffuser wall 40 (see FIG. 6). Alternatively, both the start points 56 and the termination points 58 of the deswirl ribs 50 may be positioned at various axial locations along the diffuser wall 40 (see FIG. 7).

Figure 8:
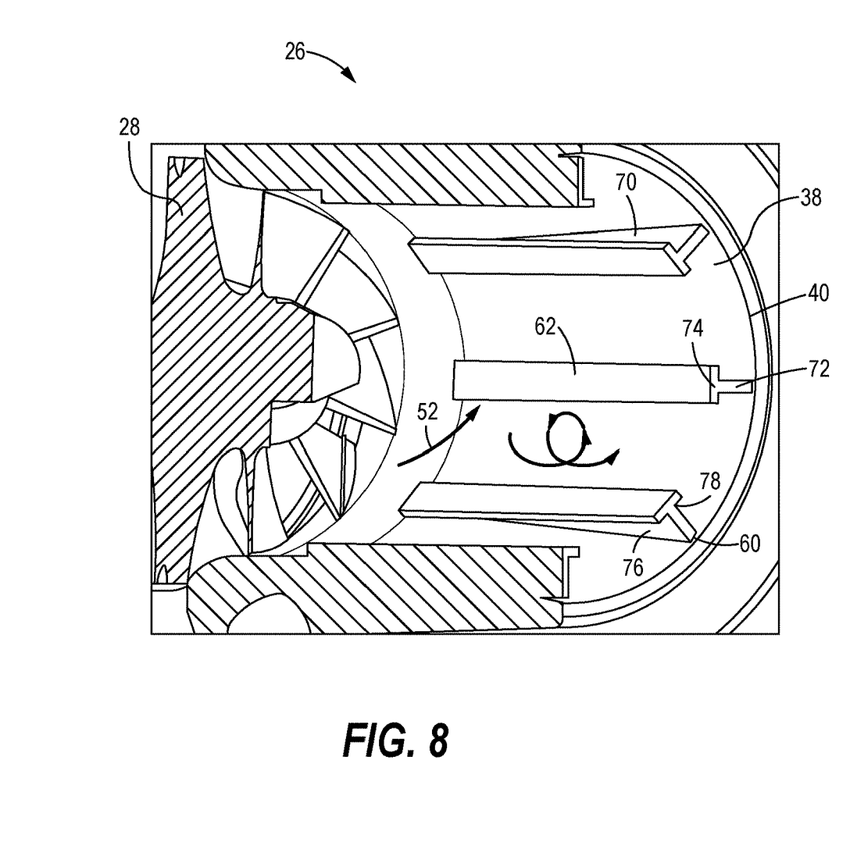
FIG. 8 is a cross-sectional view of the turbine section similar to FIG. 2, but with the deswirl ribs having a T-shape in cross-section, constructed in accordance with the present disclosure.
Figure 9:
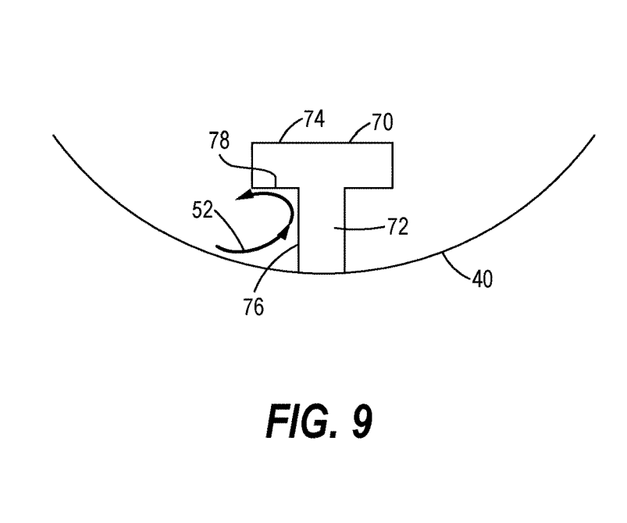
FIG. 9 is a schematic representation of the influence of the T-shaped deswirl ribs on rotating exhaust gas flow, constructed in accordance with the present disclosure.

The deswirl ribs 50 of FIGS. 2-7 have a rectangular shape in cross-section. In another embodiment, the diffuser wall 40 has deswirl ribs 70 with a T-shape in cross-section, as shown in FIGS. 8-9. Specifically, each of the T-shaped deswirl ribs 70 have a radially extending bar 72 that is capped by a lateral cross-bar 74 at the second, radially inward end 62. The cross-bar 74 may prevent or block the rotating exhaust gas flow 52 from skipping over the deswirl ribs 70, and may more aggressively reduce the tangential velocity of the flow 52. As shown in FIGS. 8-9, the rotating exhaust gas flow 52 may impinge on a side face 76 of the radially extending bar 72 and/or a lower lip 78 of the cross-bar 74, with the lower lip 78 preventing the exhaust gas flow from skipping over the rib 50. The impingement of the exhaust gas flow 52 against the side face 76 and/or the lower lip 78 may generate turbulence in the flow that assists in directing the flow in the axial direction. The cross-bar 74 may extend along the entire axial length (l) of the deswirl rib 70 (see FIG. 8). Furthermore, the heights of the T-shaped deswirl ribs 70 may progressively increase along the length of the diffuser 38, as shown in FIG. 8, although the heights may be constant along the length of the diffuser 38 as well. In addition, as described above in reference to FIGS. 2-7, the T-shaped deswirl ribs 70 may extend parallel to the central axis 42 of the diffuser 38, or may be angled or curved with respect to the central axis 42. The T-shaped deswirl ribs 70 may have the same or varying axial lengths with respect to each other, and the number and angular spacings of the T-shaped deswirl ribs 70 may vary depending on various design considerations.

Figure 10:
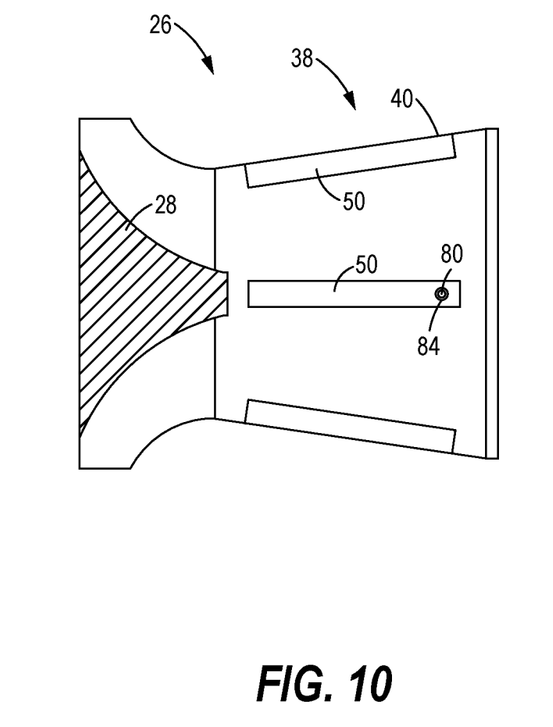
FIG. 10 is a cross-sectional view of the turbine section similar to FIG. 2, but with one of the deswirl ribs having a mounting structure for mounting a nitrogen oxide ($NO_x$) sensor, constructed in accordance with the present disclosure.
Figure 11:
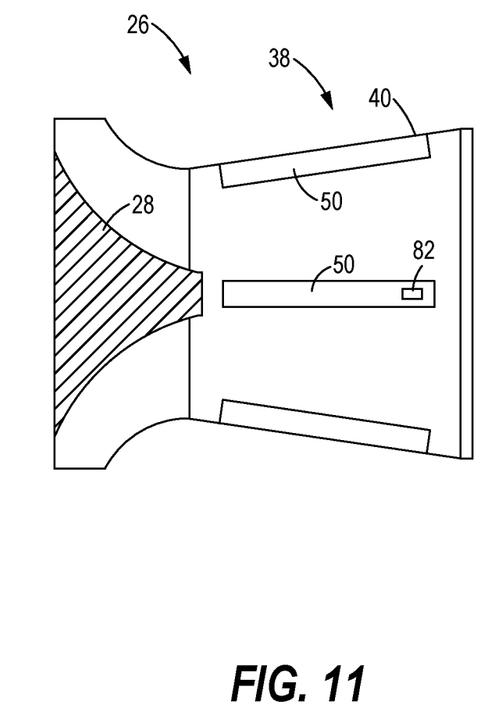
FIG. 11 is a cross-sectional view of the turbine section similar to FIG. 10, but with the $NO_x$ sensor mounted on the deswirl rib, constructed in accordance with the present disclosure.

In an alternative embodiment, one or more of the deswirl ribs 50 (or the T-shaped deswirl ribs 70) includes a mounting structure 80 for mounting a $NO_x$ sensor 82 (see FIGS. 10-11). The mounting structure 80 may be a boss 84 welded or otherwise affixed to the deswirl rib 50 that facilitates mounting of the $NO_x$ sensor 82 to the deswirl rib 50. Alternatively, the mounting structure 80 may be other types of structures to facilitate mounting of the $NO_x$ sensor 82 such as, but not limited to, fasteners, fastener receivers, or protruding features. The $NO_x$ sensor 82 may be exposed on the surface of the deswirl rib 50 to promote exposure of the $NO_x$ sensor 82 to the exhaust gases exiting the turbine wheel 28. In some arrangements, the $NO_x$ sensor 82 may be embedded or partially embedded in the deswirl rib 50 such that the $NO_x$ sensor 82 is internally positioned within the deswirl rib 50.

Mounting the $NO_x$ sensor 82 to the deswirl rib 50, as opposed to placing the $NO_x$ sensor 82 on the diffuser wall 40 as in current systems, offers some advantages. The $NO_x$ sensor 82 on the deswirl rib 50 may be more exposed to exhaust gases as the exhaust gases exit the turbine wheel 28 at the design point and under off-design conditions. In contrast, diffuser wall mounted $NO_x$ sensors of the prior art may be exposed to recirculated exhaust gas flow when the turbine is operating at the design point. Placing the $NO_x$ sensor 82 on the deswirl rib 50 positions the $NO_x$ sensor 82 a little more deeply into the exhaust gas flow to enhance $NO_x$ detection in exhaust gas as the exhaust gas is discharged from the turbine wheel 28. The deswirl rib 50 may also support the structural stability of the $NO_x$ sensor 82 in the high vibration environment of the diffuser 38.

INDUSTRIAL APPLICABILITY

In general, the teachings of the present disclosure may find applicability in many industries including, but not limited to, automotive industries. For instance, the teachings of the present disclosure may be applicable to industries using engine systems with a turbocharger and an aftertreatment catalyst positioned at or near the discharge of the turbine section of the turbocharger.

Figure 12:
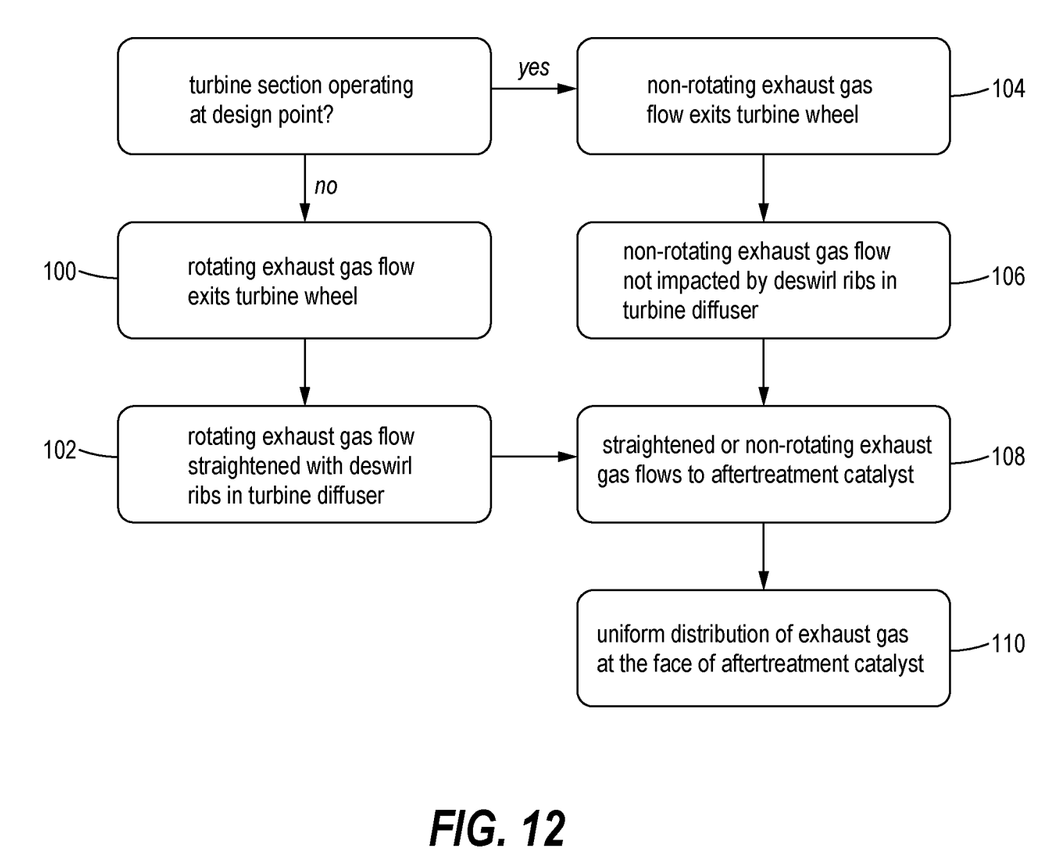
FIG. 12 is flowchart of a series of steps that may be involved in providing a uniform distribution of exhaust gas flow to the face of the aftertreatment catalyst, in accordance with a method of the present disclosure.

FIG. 12 is a flowchart showing a series of steps that may be involved in providing a uniform distribution of exhaust gas flow to the face of the aftertreatment catalyst 32, in accordance with the present disclosure. As shown, the steps may vary depending on whether the turbine section 26 is operating under design point or off-design conditions. If the turbine section 26 is operating under off-design conditions, then rotating exhaust gas flow may be discharged from the turbine wheel 28 into the diffuser 38 according to a block 100. The rotating exhaust gas flow may then be straightened (or at least partially straightened) into non-rotating, axial flow as the rotating exhaust gas impacts the deswirl ribs 50 (or the T-shaped deswirl ribs 70) along the diffuser wall 40 (block 102). If, however, the turbine section 26 is operating at the design point, the exhaust gas flow discharged from the turbine wheel 28 may flow axially and may be non-rotating (block 104), such that the deswirl ribs 50 or 70 do not have an impact on the flow direction of the exhaust gas (block 106). Thus, under either design point conditions or off-design conditions, substantially straightened or non-rotating exhaust gas may be presented to the aftertreatment catalyst 32 according to the block 108. As such, a uniform distribution of the exhaust gas across the face of the aftertreatment catalyst 32 is achieved to support the catalytic efficiency of the catalyst 32 under both design point and off-design conditions (block 110). This is an advantage over the prior art systems in which the aftertreatment catalyst is positioned at or near the downstream end of the diffuser, and a uniform distribution of exhaust gas across the face of the catalyst may only be achieved when the turbine is operating under design point conditions.

The present disclosure provides a plurality of deswirl ribs along the diffuser wall of a turbine diffuser that act as flow straighteners on the exhaust gas that is discharged from the turbine wheel. The deswirl ribs may reduce the tangential velocity of the exhaust gas when the exhaust gas is rotating under off-design conditions, but may have little to no impact on non-rotating exhaust gas flow under design point conditions. Upon impingement of the rotating exhaust gas on the deswirl ribs, turbulence may be generated in the flow and the flow is directed axially. In some embodiments, the deswirl ribs may have a T-shape with a cross-bar that may assist in capturing the rotating exhaust gas to prevent the exhaust gas from bypassing the straightening influence of the deswirl ribs. As such, non-rotating exhaust gas flow is presented to the aftertreatment catalyst under both design point and off-design conditions. The non-rotating exhaust gas flow more evenly distributes across the face of the catalyst to enhance catalytic efficiency. This is an improvement over prior art systems in which rotating exhaust gas primarily flows to the outer edges of the catalyst under off-design conditions.

Furthermore, one of the deswirl ribs may provide a site for mounting a $NO_x$ sensor in the turbine diffuser. Mounting the $NO_x$ sensor on the deswirl rib, rather than directly on the diffuser wall as in the prior art, more favorably positions the $NO_x$ sensor for exposure to exhaust gases as the exhaust gases are discharged from the turbine wheel under both design point and off-design conditions. Furthermore, the structure of the deswirl rib may support the $NO_x$ sensor in the high vibration environment of the turbine diffuser, reducing vibrations at the sensor and the chances of breaking.

What is claimed is:

1. A turbine diffuser configured for use in a turbocharger, comprising:
   a diffuser wall defining the diffuser and circumscribing a central axis of the diffuser, wherein the diffuser wall is angled relative to the central axis of the diffuser such that a cross-sectional area of the diffuser increases as the diffuser wall extends from an upstream end proximate a turbine wheel of the turbocharger to a downstream end opposite the turbine wheel; and
   a plurality of deswirl ribs each extending axially along the diffuser wall, each of the deswirl ribs having a first end attached to the diffuser wall and an opposing second end exposed in an interior space of the diffuser, the deswirl ribs being configured to reduce rotation of exhaust gas that flows through the diffuser.

2. The turbine diffuser of claim 1, wherein the deswirl ribs have a rectangular shape in cross-section.

3. The turbine diffuser of claim 1, wherein each of the deswirl ribs has a T-shape in cross-section.

4. The turbine diffuser of claim 1, wherein a height of each of the deswirl ribs progressively increases along a length of the diffuser wall.

5. The turbine diffuser of claim 1, wherein a height of each of the deswirl ribs is constant along a length of the diffuser wall.

6. The turbine diffuser of claim 1, wherein one of the deswirl ribs includes a mounting structure configured to facilitate mounting a nitrogen oxide (NOx) sensor to the deswirl rib.

7. The turbine diffuser of claim 1, wherein each of the deswirl ribs extend radially inward from the diffuser wall toward the central axis.

8. The turbine diffuser of claim 1, wherein the deswirl ribs have different axial lengths.

9. The turbine diffuser of claim 1, wherein the diffuser includes between 2 and 30 of the deswirl ribs along the diffuser wall.

10. A turbocharger for an engine system having an exhaust pipe with an aftertreatment catalyst for treating an exhaust gas, comprising:
    a compressor section;
    a turbine section rotatably coupled to the compressor section via a shaft, the turbine section including a turbine wheel and a diffuser downstream of the turbine wheel, the diffuser being defined by a diffuser wall that extends circumferentially about a central axis of the diffuser and surrounds an interior space of the diffuser, wherein the diffuser wall is angled relative to the central axis of the diffuser such that a cross-sectional area of the diffuser increases as the diffuser wall extends from an upstream end proximate the turbine wheel to a downstream end opposite the turbine wheel; and
    a plurality of deswirl ribs extending axially along the diffuser wall, each of the deswirl ribs having a first end attached to the diffuser wall and an opposing second end exposed for contact with the exhaust gas that flows through the interior space of the diffuser, the deswirl ribs being configured to reduce a tangential velocity of the exhaust gas that flows through the interior space of the diffuser.

11. The turbocharger of claim 10, wherein the deswirl ribs are only attached to the diffuser wall and are not attached to any other structure in the interior space of the diffuser.

12. The turbocharger of claim 10, wherein the downstream end is adjacent to the aftertreatment catalyst when the turbocharger is installed in the engine system.

13. The turbocharger of claim 10, wherein the deswirl ribs have a rectangular shape in cross-section.

14. The turbocharger of claim 10, wherein each of the deswirl ribs has a T-shape in cross-section.

15. The turbocharger of claim 10, wherein a height of each of the deswirl ribs is constant along a length of the diffuser wall.

16. The turbocharger of claim 10, wherein a height of each of the deswirl ribs progressively increases along a length of the diffuser wall.

17. The turbocharger of claim 10, wherein one of the deswirl ribs includes a mounting structure for mounting a nitrogen oxide (NOx) sensor to the deswirl rib.

18. A method for providing a uniform distribution of exhaust gas to an aftertreatment catalyst of an engine system having a turbocharger, the aftertreatment catalyst being positioned adjacent to a downstream end of a turbine diffuser of the turbocharger, comprising:

providing a plurality of deswirl ribs extending axially along a diffuser wall of the turbine diffuser, wherein the diffuser wall is angled relative to a central axis of the turbine diffuser such that the cross-sectional area of the diffuser increases as the diffuser wall extends from an upstream end proximate a turbine wheel of the turbocharger to a downstream end opposite the turbine wheel, each of the deswirl ribs having a first end attached to the diffuser wall and an opposing second end exposed in an interior space of the turbine diffuser;

straightening a flow of the exhaust gas flowing through the diffuser with the deswirl ribs if the exhaust gas is rotating; and allowing the straightened flow of the exhaust gas to flow to the aftertreatment catalyst.

19. The method of claim 18, wherein the deswirl ribs do not substantially impact a flow direction of the exhaust gas if the exhaust gas is not rotating.

20. The method of claim 19, wherein the deswirl ribs are only attached to the diffuser wall and are not attached to any other structure in the interior space of the diffuser.

* * * * *